3,502,693
2-HYDROXYMETHYLINDOLE QUINONES
Keizo Uzu and Kinichi Nakano, Shizuoka-ken, Japan, assignors to Kyowa Hakko Kogyo Co., Ltd., Tokyo, Japan, a corporation of Japan
Filed Feb. 28, 1967, Ser. No. 619,267
Claims priority, application Japan, Mar. 5, 1966, 41/13,164
Int. Cl. C07d 27/56; C07c 49/62
U.S. Cl. 260—326.16                    2 Claims

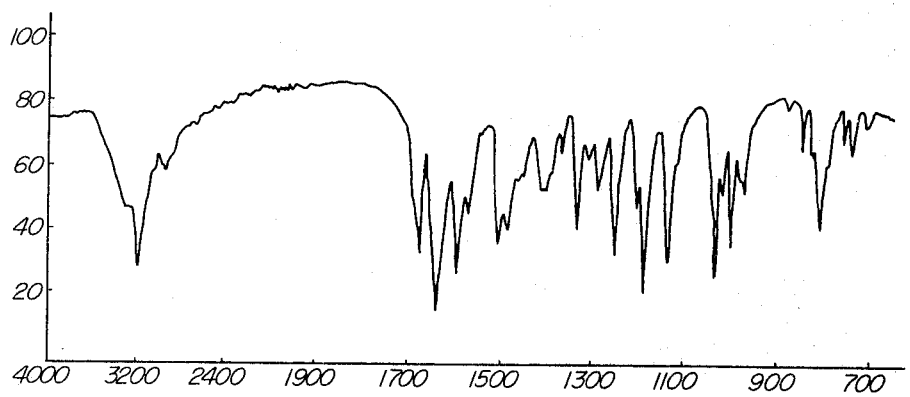

ABSTRACT OF THE DISCLOSURE

The present disclosure relates to 2-hydroxymethyl-3-alkyl-5-alkoxyindole quinones-(4,7) and to a process for preparing them. The process involves selectively nitrating the 4-position of a 2-carboalkoxy-3-alkyl-5-alkoxyindole by reacting the same with fuming nitric acid, treating the resultant nitrated derivative with lithium aluminum hydride so as to reduce the carboalkoxy group at the 2-position to a hydroxymethyl group, then selectively catalytically reducing the nitro group to an amino group, and finally oxidizing the reduced product, preferably with an alkali metal nitroso disulfonate, to give the quinone product. The synthesis of 2-hydroxymethyl-3-methyl-5-ethoxyindole quinone-(4,7) is specifically described.

---

The present invention relates to 2-hydroxymethylindole quinones and to a process for preparing these compounds. More particularly, the present invention relates to the synthesis of 2-hydroxymethyl - 5 - alkoxyindole quinones-(4,7).

A process for the synthesis of indole quinone has been reported by Teuber [Ber., 91, 2267 (1958)]. Recently, Poletto et al. reported the synthesis of 3-hydroxymethyl - 1-ethyl - 5-methoxy - 6,2-dimethylindole quinone [Journal of the American Chemical Society, 86, 3879 (1964)]. However, there is no description in the prior art relating to the synthesis of 2-hydroxymethylindole quinones.

Accordingly, one of the objects of the present invention is to provide 2-hydroxymethylindole quinones and a process for synthesizing these compounds.

Another object of the present invention is to provide a process for synthesizing 2-hydroxymethylindole quinones which may be carried out efficaciously to give the desired product in good yield.

A further object of the invention is to provide certain novel 2-hydroxymethyl-3-alkyl-5-alkoxyindole quinones-(4,7).

These and other objects and advantages of the present invention will become apparent to those skilled in the art from a consideration of the attached drawing and the following specification.

In accordance with the present invention, it has been found that 2-hydroxymethylindole quinones may be prepared by carrying out a sequence of reactions as shown in the following reaction scheme.

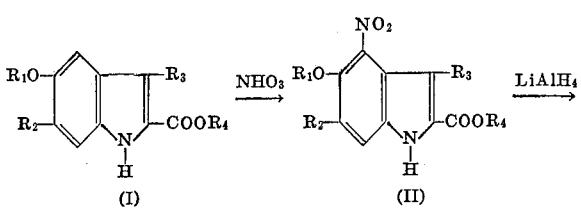

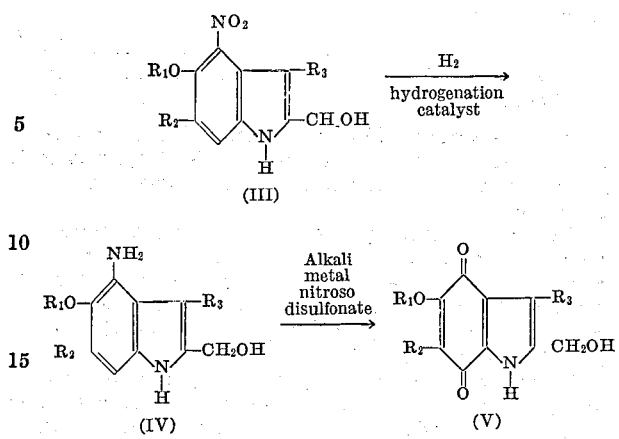

$R_1$, $R_3$ and $R_4$ are either methyl ($CH_3$—) or ethyl ($C_2H_5$—) and $R_2$ is either hydrogen, methyl or ethyl.

Accordingly, as shown hereinabove, only the 4-position of the 2-carboalkoxyindole, shown as Formula I, is selectively nitrated when it is reacted with a calculated amount of fuming nitric acid. The fuming nitric acid may be contained in glacial acetic acid or acetic anhydride or a mixture of these solvents. Ambient temperature is quite sufficient for this reaction, but it has been found that the reaction proceeds favorably within the temperature range of from 0° to 100° C. The selective reduction of the 4-nitro-2-carboalkoxyindole shown by Formula II proceeds smoothly when an adequate amount of lithium aluminum hydride is used as the reducing agent. It is generally considered that, when any compound such as that shown by Formula II is reduced by means of a reducing agent such as lithium aluminum hydride, the nitro group as well as the carboalkoxy group will be subjected to the reduction. Actually, even with the addition of a large excess amount of lithium aluminum hydride, the reduction of the nitro group is effected only by means of a subsequent catalytic reduction with hydrogen. As catalysts which may be used in this latter reduction, those conventionally employed for catalytic reductions, such as palladium, nickel, platinum, etc., are quite suitable. The catalytic reduction may be carried out at atmospheric pressure, but can also be effected under pressure. Moreover, the reduction may be effectively carried out in a solvent solution of the reactant; suitable therefor are, for example, alcohols such as methanol and ethanol, however, any organic solvent conventionally used for catalytic reductions may be used. After the completion of the catalytic reduction, the amine produced thereby can be separated and purified and then oxidized to give the quinone product. However, it is also possible to obtain the desired 2-hydroxymethylindole quinone without any need of purification by reacting the solution of amine derivative directly with an oxidizing agent such as an alkali metal nitroso disulfonate, for example, sodium nitroso disulfonate or potassium nitroso disulfonate.

Thus is can be seen that 2-hydroxymethylindole quinones may be readily produced by the process described hereinabove.

The 2-hydroxymethylindole quinones produced by the present invention are quite useful. For example, they inhibit the growth of bacteria and thus are useful as a bacteriostat. Taking the specific compound 2-hydroxymethyl-3-methyl-5-ethoxyindole quinone-(4,7) [A] as an example, the concentration amounts shown in Table 1 are effective in inhibiting the growth of Escherichia coli, Bacillus subtilis and Sarcina lutea, respectively.

TABLE

| Microorganism: | Concentration of (A) required for inhibition of growth (γ/ml.) |
|---|---|
| Escherichia coli | 25 |
| Bacillus subtilis | 100 |
| Sarcina lutea | 25 |

The compounds produced by the present invention may also be used in the synthesis of highly useful drugs such as 2-acyloxymethyl derivatives, and 2-carbamoyloxymethyl derivatives.

The attached drawing shows the infra-red absorption spectrum of 2-hydroxymethyl-3-methyl-5-ethoxyindole quinone-(4,7) as an example of the spectra of the 2-hydroxymethylindole quinones produced by the present invention. The preparation of this specific compound is described in the example.

The following example is given merely as illustrative of the present invention and is not to be considered as limiting. Unless otherwise noted, the percentages therein are by weight.

EXAMPLE

The first part of this example relates to the synthesis of 2-carboethoxy-3-methyl-4-nitro-5-ethoxyindole.

Five grams of 2-carboethoxy-3-methyl-5-ethoxyindole is dissolved in a mixed solution of 50 cc. of acetic acid and 50 cc. of acetic anhydride, to which 1 cc. of fuming nitric acid (specific gravity, 1.50) is added, and allowed to stand for two hours at ambient temperature. A yellow precipitate is produced by the addition of water thereto. Then, 4.5 grams of yellow pillar-shaped crystals is obtained by filtering the precipitate and recrystallizing the same from dilute ethanol.

The yield of product is 76.3%. The melting point thereof is 177–178° C. Elemental analysis shows the following values:

Theoretical values—C=57.53%, H=5.52%, N=9.58%.
Observed values—C=57.41%, H=5.42%, N=9.62%.

The following procedure relates to the synthesis of 2-hydroxy-methyl-3-methyl-4-nitro-5-ethoxyindole.

Four grams of 2-carboethoxy-3-methyl-4-nitro-5-ethoxyindole, prepared as described above, is dissolved in anhydrous tetrahydrofuran, into which a solution prepared by suspending 600 mg. of lithium aluminum hydride in anhydrous ether is dropped. After about one hour of reaction at ambient temperature, the mixture is extracted with an organic solvent and concentrated to dryness after removing the solvent therefrom. The residue is recrystallized from dilute ethanol. The product comprises yellow scale-type crystals.

The yield of product is 3.3 grams, which amounts to a yield of 96.4%. The melting point of the product is 184–185° C. Elemental analysis shows the following results:

Theoretical values—C=57.59%, H=5.64%, N=11.20%.
Observed values—C=57.47%, H=5.69%, N=10.86%.

The following steps relate to the synthesis of the product 2-hydroxy-methyl-3-methyl-5-ethoxyindole quinone-(4,7).

Three grams of 2-hydroxymethyl-3-methyl-4-nitro-5-ethoxyindole [the compound represented by Formula III and prepared as described above] is dissolved in 100 cc. of methanol to which 600 mg. of a 5% palladium-carbon catalyst is added; catalytic reduction thereof is then carried out by treating the same with hydrogen at ambient temperature and at atmospheric pressure. After the calculated amount of hydrogen is absorbed, the catalyst is removed and the resultant reaction mixture is stirred for one hour after the addition thereto of a solution prepared by dissolving 8 grams of potassium nitroso disulfonate in 200 cc. of water and 200 cc. of a ⅙ M $KH_2PO_4$ aqueous solution. The reaction mixture is subsequently extracted with an organic solvent, the solvent is removed and the extract is concentrated to dryness. The residue is then recrystallized from ethanol to give 1.5 grams of reddish-orange needle-shaped crystals.

The yield of product is 50.7%. The melting point thereof is 213° C. Elemental analysis shows the following values:

Theoretical values—C=61.27%, H=5.57%, N=5.96%.
Observed values—C=61.34%, H=5.60%, N=5.76%.

In a similar manner, the other compounds represented by Formula V above may be prepared, the only difference being in the selection of the appropriate 2-carboalkoxy-3-alkyl-5-alkoxyindole starting material, i.e., that $R_1$, $R_2$ and $R_3$ correspond to the $R_1$, $R_2$ and $R_3$ groups desired in the final product.

What is claimed is:

1. A compound of the formula

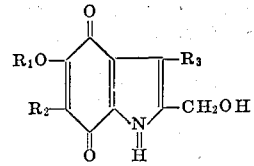

wherein $R_1$ and $R_3$ are methyl or ethyl and $R_2$ is hydrogen, methyl or ethyl.

2. 2-hydroxymethyl-3-methyl-5-ethoxyindole quinone-(4,7).

References Cited

UNITED STATES PATENTS

| 3,226,397 | 12/1965 | Allen et al. | 260—326.16 XR |
| 3,226,398 | 12/1965 | Allen et al. | 260—326.16 |
| 3,226,399 | 12/1965 | Allen et al. | 260—326.16 XR |

ALEX MAZEL, Primary Examiner

J. A. NARCAVAGE, Assistant Examiner

U.S. Cl. X.R.

260—326.13, 999